United States Patent [19]

Anderson

[11] 4,442,887
[45] Apr. 17, 1984

[54] APPARATUS FOR HARNESSING WAVE MOTION AND SOLAR ENERGY AND CORIOLIS ACCELERATION OF NATURE FOR SOLAR DISTILLATION USE

[76] Inventor: Max F. Anderson, R.R. #1, Stewardson, Ill. 62463

[21] Appl. No.: 53,828

[22] Filed: Jul. 2, 1979

[51] Int. Cl.³ .................................................. F24J 3/02
[52] U.S. Cl. ............................... 165/85; 202/185 R; 202/234; 203/10; 203/49; 203/DIG. 1; 415/DIG. 8; 417/331
[58] Field of Search ...................... 203/DIG. 1, 49, 10, 203/DIG. 17; 165/45, 111; 417/331; 415/DIG. 8, 3 A, 3, 2 A, 2; 202/234, 185 R, 189; 126/430

[56] References Cited

U.S. PATENT DOCUMENTS

| | | | |
|---|---|---|---|
| 1,816,592 | 7/1931 | Knapen | 165/111 |
| 1,952,520 | 3/1934 | Urquhart | 165/45 |
| 1,953,678 | 4/1934 | Govers | 165/111 |
| 2,109,926 | 3/1938 | Nelson | 165/45 |
| 2,134,121 | 10/1938 | Harper | 165/45 |
| 2,761,292 | 9/1956 | Coanda et al. | 165/45 |
| 3,015,613 | 1/1962 | Edmondson | 202/234 |
| 3,317,406 | 5/1967 | Beard | 202/234 |
| 3,414,481 | 12/1968 | Kelly, Jr. | 203/DIG. 1 |
| 3,436,908 | 4/1969 | Van Delic | 203/DIG. 1 |
| 3,970,525 | 7/1976 | Kurek | 203/DIG. 1 |
| 4,018,543 | 4/1977 | Carson | 415/2 A |
| 4,070,131 | 1/1978 | Yen | 415/3 A |
| 4,076,463 | 2/1978 | Welczer | 417/331 |
| 4,105,362 | 8/1978 | Sforza | 415/3 A |
| 4,131,513 | 12/1978 | Green | 202/234 |
| 4,197,162 | 4/1978 | Cardinal | 203/DIG. 1 |

FOREIGN PATENT DOCUMENTS

| | | | |
|---|---|---|---|
| 514673 | 12/1930 | Fed. Rep. of Germany | 165/45 |
| 2291380 | 6/1976 | France | 415/3 |
| 608260 | 12/1978 | Switzerland | 202/234 |

*Primary Examiner*—Wilbur L. Bascomb, Jr.
*Attorney, Agent, or Firm*—Victor R. Beckman

[57] ABSTRACT

Individually useable wave-powered pumping means, solar distillation means, and cyclonic wind generating means, together with a system which employs each of them for harnessing natural energy sources are disclosed. Wave and solar energy, together with Coriolis acceleration are employed in the system which includes a basin for water situated near an ocean, or othe such body of water, having a surface subject to wave action. A solar energy transmitting cover is provided over the basin for solar heating, and evaporation of water contained therein. Vapor condensing means are located adjacent the bottom of the basin, and an upwardly extending inlet conduit, or passageway, connects the condenser to a source of water vapor above the water surface of the covered basin. Cooled air, and distilled water, are discharged from the condenser to a location outside the covered basin. Due to Coriolis acceleration, air enters the inlet conduit to the condenser with a rotational, or cyclonic, motion and wind driven means are located in the rotating air path for drive rotation thereof. Cooling fluid for the vapor condensing means is provided by relatively cold ocean water pumped into the basin by wave operated piston pumping means which includes an elongated upright cylinder anchored to the ocean floor near the shore. A piston, with an attached upwardly extending piston rod, is reciprocally movable within the cylinder. A surface float is attached to the piston rod for upward movement thereof as the float moves upwardly with a wave crest. Gravity returns the piston to a lowered position as the float travels downwardly from the wave crest to a wave trough. The piston is provided with inlet, check valve means through which ocean water passes into the upper end of the cylinder on the gravity-produced downstroke of the piston. Discharge, check, valve means are included in the connection of the pump cylinder to the basin to prevent reverse flow of ocean water therein. A novel elongated tethered surface float is used to utilize the full wave motion, even under small wave conditions.

8 Claims, 5 Drawing Figures

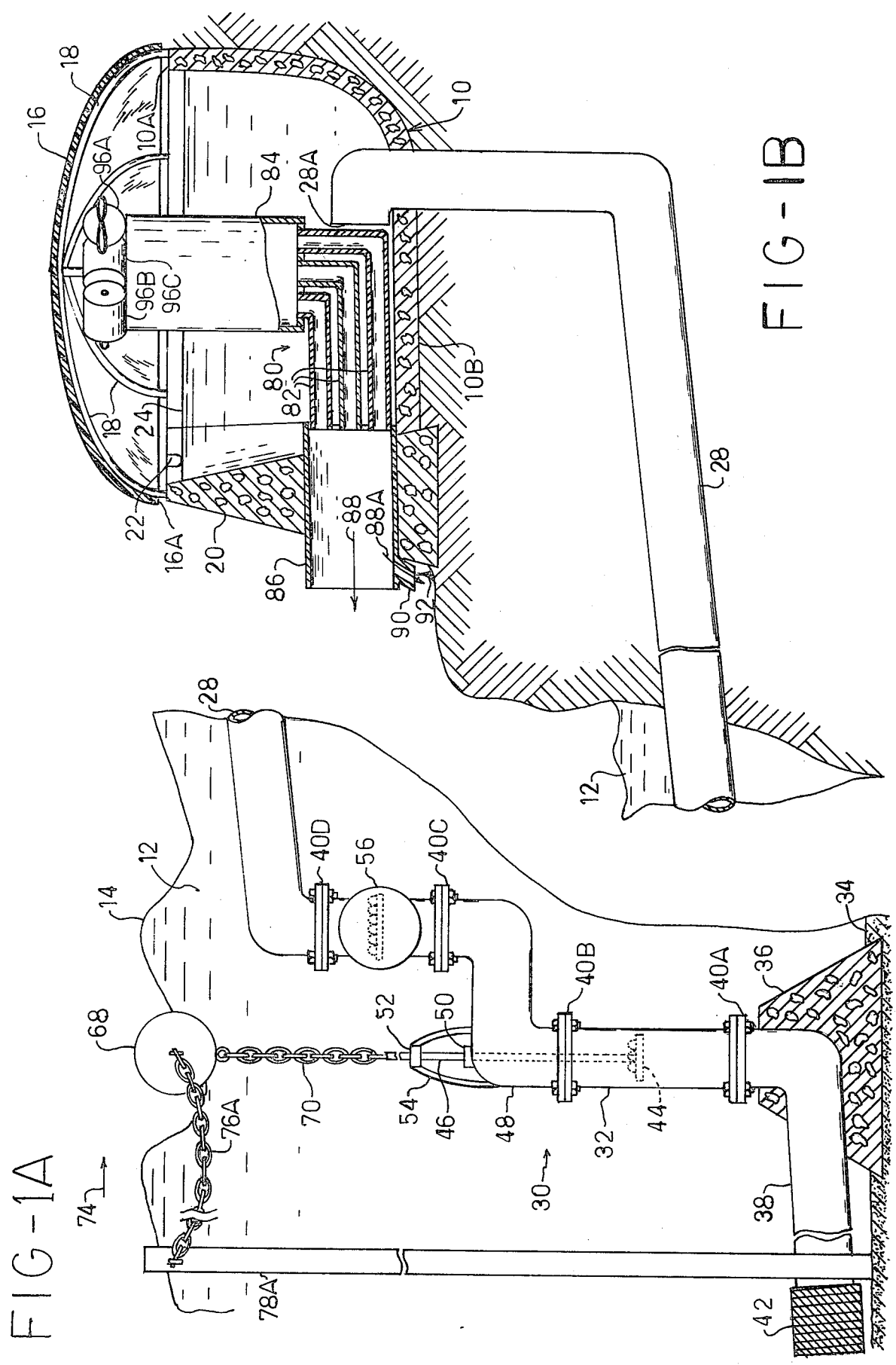

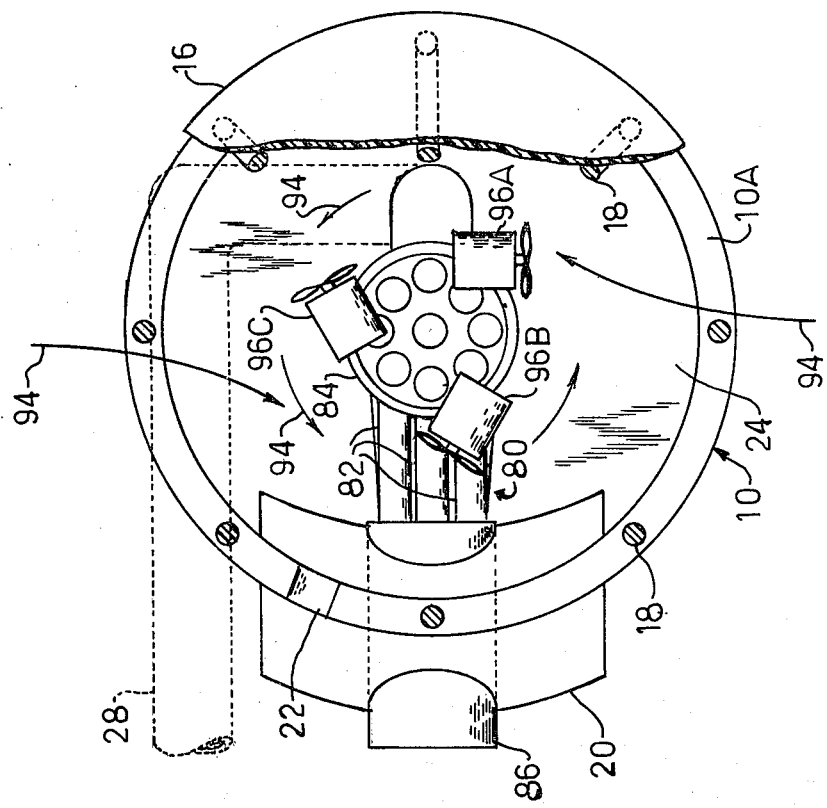
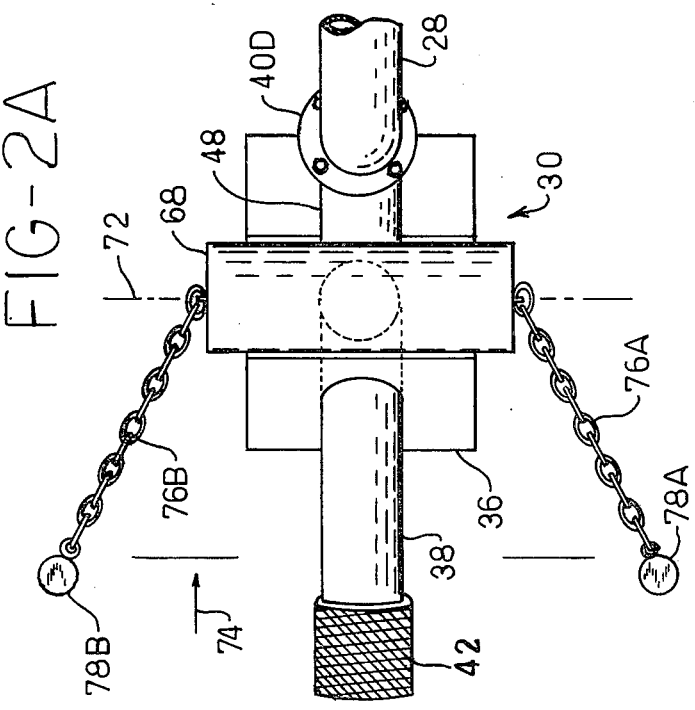
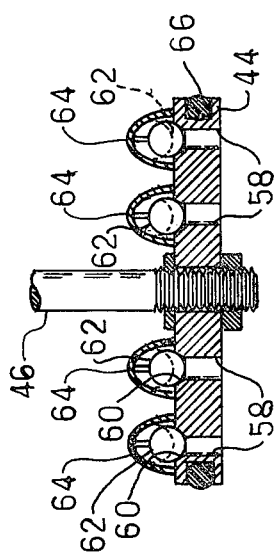

APPARATUS FOR HARNESSING WAVE MOTION AND SOLAR ENERGY AND CORIOLIS ACCELERATION OF NATURE FOR SOLAR DISTILLATION USE

BACKGROUND OF THE INVENTION

Solar distillation means for distillation of ocean water are well known as shown, for example, in U.S. Pat. Nos. 3,338,797; 3,317,406; 3,775,257; 4,118,283, and numerous other patents. Wave powered pumps also are known as shown, for example, in U.S. Pat. Nos. 1,953,285; 3,918,260, and others. Although windmills, and like wind-driven devices, are well known, no prior art arrangements for generating cyclonic air movement using Coriolis acceleration, which rotating air may be readily harnessed, are known to Applicant.

SUMMARY OF THE INVENTION AND OBJECTS

An object of this invention is the provision of improved method and means of producing a cyclonic wind of great magnitude suitable for driving wind-propelled means such as propeller-generators, and the like.

An object of this invention is the provision of method and means of the above-described type which functions for solar distillation of sea water, or the like.

An object of this invention is the provision of improved solar distillation method and means whereby a large volume of fresh water may be produced using solely wave-motion and solar energy sources.

An object of this invention is the provision of an improved wave-operated pump for pumping sea water, which pump is of extremely simple design, operates over a wide wave amplitude and tidal level range, and which includes a novel tethered surface float which moves up and down for pump operation with small, as well as large, wave action.

An object of this invention is the provision of a system which operates solely on natural energy sources including solar and wave-motion energy and Coriolis acceleration for production of cyclonic winds and the distillation of sea water.

The above and other objects and advantages are achieved by use of a basin for water located near an ocean where wind-produced waves are prevelant. The system is advantageously located in a hot, dry, climate which water is in short supply. A cover is provided over the basin through which solar energy is transmitted for heating, and evaporating, water contained in the basin. Vapor condensing means are located adjacent the bottom of the basin to which water vapor-laden air from the above the water surface of the basin is supplied through a vertically extending cylindrical inlet conduit, or passageway. At the vapor condensing means, heat is extracted from the water vapor, reducing the same to water, and the water and cooled air are discharged from the condensing means through a downwardly inclined discharge conduit, or passageway extending from the condenser to a location outside the covered basin. Air in the condenser is cooled to a temperature below ambient temperature for downward flow thereof through the discharge conduit from the condenser. Due to Coriolis acceleration, air under the dome enters the inlet conduit to the condenser with a whirling, cyclonic, motion, and vane driven means, such as motor generators, or the like, are located in the path of the whirling air for drive rotation thereof. A surface type condenser is used whereby cold ocean water may be used to cool the moisture-laden air flowing therethrough. Any excess ocean water pumped into the basin is discharged therefrom as by use of an overflow, spillway, or the like. For self-sufficient system operation, wave-operated pump means may be used to pump ocean water into the basin. The pump includes an elongated upright pump cylinder anchored to the ocean floor. A piston having inlet check valve means therein is reciprocally mounted in the cylinder, and a piston rod attached to the piston extends vertically upwardly from the upper end of the pump cylinder. A discharge pipe, with discharge check valve means therein, connects the upper end of the cylinder to the basin for the supply of ocean water thereto as a source of cooling liquid for the condenser contained therein as the pump piston is moved up and down. A surface float is attached to the upper end of the piston rod to raise the piston for upward pumping movement thereof as the float moves upwardly with a wave crest. As the float moves downwardly from the crest into a wave trough, gravity returns the piston to a lowered position. The pump cylinder is of sufficient length to allow for piston operation along different axial portions thereof depending upon the existing tide and wave conditions.

The invention will be better understood from the following detailed description when considered with the accompanying drawings.

BRIEF DESCRIPTION OF THE DRAWINGS

In the drawings, wherein like reference characters refer to the same parts in the several views:

FIGS. 1A and 1B together show, in diagrammatic form, a side elevational view, with parts shown broken away for clarity, of a novel system employing solar and wave-motion energy, and Coriolis acceleration, for use in producing distilled water and a cyclonic wind, which system embodies the present invention; a novel wave-operated pump being shown in FIG. 1A and novel solar still and cyclonic wind generating means being shown in FIG. 1B;

FIGS. 2A and 2B together show a diagrammatic plan view of the system illustrated in FIGS. 1A and 1B, with a portion of the solar cover shown broken away for clarity; and FIG. 3 is an enlarged cross-sectional view of a piston with novel check valve means therein of the type which may be employed in the piston pump shown in FIGS. 1A and 2A.

The rapid population growth throughout the world, its increasing concentration, the continually increasing use of water and energy by both individuals and industry, the recognized limited supply of certain energy sources including, for example, fossil fuels, make existing water and energy supplies inadequate in many parts of the world. The present invention is directed to method and means of harnessing nature's energy sources, namely wave-motion and solar energy for the production of fresh water. Additionally, systems embodying the present invention include massive air flow subject to Coriolis acceleration for the production of cyclonic winds which may be used to drive vane-operated means such as propeller-generators for the production of electrical energy.

Referring to FIGS. 1A, 1B, 2A and 2B, the novel system of this invention is shown to include a basin 10 situated near an ocean, sea, or like body of water 12 where surface waves 14 are prevalent. There are many locations throughout the world where common surface waves, produced by the wind, prevail near land. The present invention is of particular use at such locations where the climate is hot and dry.

The basin 10 preferably is of generally circular shape and is covered by a solar energy-transmitting cover 16. For purposes of illustration, a dome-shaped cover is shown supported on a frame 18 which, in turn, is supported on, or adjacent, the edge of the basin. Air inlet means for the dome 16 are provided along at least a portion of the dome as by spacing the lower edge 16A of the dome from the upper edge 10A of the basin. Obviously, the basin simply may comprise a natural or excavated depression without separate structural walls, depending upon the type of soil present. Any excess ocean water pumped into the basin by novel pumping means described hereinbelow is drained therefrom as by use of an overflow drain, spillway, or the like. The illustrated basin includes a dam, or barrier, 20 formed with a spillway 22 over which excess water may flow. The brine may be conducted into evaporation ponds, for example, for evaporation of the water and recovery of salt therefrom.

The basin 10 is supplied with water 24 from the ocean, or sea, 12 through a pipe 28 extending between the basin and a novel wave-operated pump 30. The illustrated pump includes an elongated vertical cylinder 32 which is anchored to the bottom of the ocean floor 34 as by use of an anchor block 36 comprising, for example, a massive reinforced concrete structure of great weight. In the illustrated arrangement the pump cylinder 32 is attached to the upper end of a generally L-shaped intake and supporting pipe 38 secured to the anchor block as by embedding a portion thereof in the block. Flanged coupling means 40A may be used for attaching the vertical pump cylinder to the supporting pipe. The inlet end of the pipe 38, which is provided with a filter 42, is located away from the shore a sufficient distance to avoid pumping of suspended mud and silt normally produced by wave action adjacent the shore line.

The novel wave-operated pump includes a piston 44 reciprocally movable within the cylinder 32, and a piston rod 46 attached to the piston. The upper end of the cylinder 32 is closed by a pump head 48 attached thereto by flanged coupling means 40B. The piston rod 46 extends vertically upwardly through a stuffing box 50 at an aperture in the head 48, and through a guide bearing 52 at the upper end of a supporting bracket 54 attached to the head.

One or more check valves are included in the connection of the pump 30 to the basin 10. In the illustrated arrangement a single check valve 56 is included which is mounted between the cylinder head 48 and feed line 28. Flanged coupling means 40C and 40D are shown for connecting the check valve to the pump and feed line. The illustrated valve 56 functions as a pump discharge valve, preventing the reverse flow of water into the pump cylinder 32 from the feed line 28.

The pump piston 44, is provided with pump inlet valve means through which sea water passes during the piston down-stroke. The piston, shown in enlarged sectional view in FIG. 3, is formed with a plurality of apertures 58 therethrough having generally beveled upper edges 60 comprising seats for ball valve members 62. The balls are confined for generally vertical movement by cages 64 positioned over the apertures. On the piston upstroke, the ball valve members 62 are seated on the piston to close the apertures 58 therein, as shown in FIG. 3. Consequently, on the piston upstroke, water within the cylinder 32 is lifted, or forced, upwardly through the discharge check valve 56 into the supply line to the basin 10. On the piston downstroke, the ball valve members 62 lift off the valve seats and into a raised position, shown in broken lines in FIG. 3, within the cages 64, to allow for passage of sea water through the check valve means. A seal ring 66 carried in a groove in the edge of the piston provides for sealing engagement between the piston and cylinder wall.

The pump discharge check valve 56 may be of similar construction to the ball-type check valve included in the pump piston described above. It will be apparent, however, that many other types of check valves, including both horizontal and vertical types, are known which may be used as pump inlet and discharge valves in place of the illustrated vertical caged-ball type valves.

A float 68 is attached to the upper end of the piston rod 46 through flexible connecting means such as chain 70, which float has sufficient buoyancy to float on the ocean surface for up and down movement with the surface waves 14. The pump cylinder 32 is of a sufficient length to accomodate maximum amplitude (height) waves normally encountered at the location, and the normal range of tides thereat. It will be understood, then, that the piston 44 operates within different portions, or segments, of the cylinder 32, depending upon the current wave and tide conditions. In the case of severe storm and/or tide conditions, the piston 44 may reach the upper or lower-most limits of travel, and suitable stop means, not shown, may be included at opposite ends of the cylinder 32 to limit piston travel to prevent damage to the pump. With the present pump arrangement, piston upstroke is provided as the float 68 moves up toward the crest of a wave. Gravity on the piston returns the same to a lowered position for downstroke movement when the float moves downwardly toward a wave trough.

In accordance with one aspect of the invention, an elongated surface float 68 is employed having a longitudinal axis 72. The float is tethered in such a manner as to maintain the axis 72 generally parallel to the length of the waves, that is, normal to the direction of wave travel. In FIGS. 2A and 2B the direction of normal wave travel is indicated by arrow 74. By this means, the opposite ends of the float move up and down together with the waves for up and down movement of the connecting chain 70, thereby avoiding rocking motion of the float about the connection to the chain. To this end, the surface float 68 is tethered by lines, such as chains 76A and 76B attached to opposite ends of the float. The opposite ends of the tether chains are attached to posts, or towers, 78A and 78B anchored to the ocean bottom seaward of the pump 30. The tether, or positioning chains 76A and 76B not only maintain the longitudinal float axis 72 in alignment with the length of the waves, but also help to maintain the float directly over the pump 30. In this way, undue radial forces on the piston rod 46, particularly toward shore, are avoided.

Continuing now the description of the solar still, relatively cold ocean water is pumped into the basin 10 by wave-operated pump 30 through line 28. The discharge end 28A of the cold ocean water supply pipe 28 is directed for flow through, or along, vapor condensing means 80 located adjacent the bottom of the basin 10 for cooling warm humid air passed therethrough and condensing water vapor contained therein. Any suitable condensing means may be used. For purposes of illustration only, and not by way of limitation, the condenser 80 is shown comprising a plurality of air tubes 82 extending from an air inlet conduit, or passage, 84 to an air outlet conduit, or passage 86.

The air inlet passage 84 provides communication between the condenser 80 and the solar-heated air beneath the dome 16 above the level of water 24 contained in the basin 10. The air outlet passage 86 provides communication between the condenser 80 and a location outside of the dome 16. In the illustrated arrangement, the outlet passage 86 extends through the dam 20. The bottom 10B of the basin is inclined downwardly toward the dam 20 for flow of the cold ocean water from pipe 28 therealong, and along sections of the condenser tubes 82 extending generally parallel to the basin bottom. The condenser tube sections along the bottom of the basin, and the discharge tube 86, also incline downwardly toward the outlets thereof for downward flow of cooled air and condensed water vapor contained therein.

In operation of the still, the suface of water 24 in the basin 10 is heated by solar energy transmitted through the dome 16 for evaporation thereof. Warm humid air enters the condenser 80 through vertical passage, or conduit 84, and is cooled by cold ocean water pumped into the basin by the wave-operated pump 30. The air within the condenser 80 is cooled to a lower temperature than ambient temperature, at least during warm daylight periods. Cooled air within the condenser, being heavier than air outside the discharge conduit 86, therefore flows downwardly along the condenser tubes and discharge conduit 86, in the direction of arrow 88, to exit from the system. As mentioned, ambient air is drawn into the system beneath the lower edge 16A of the dome 16. Condensed water vapor also flows from the condenser tubes 82 and discharge tube 86 and, if desired, a spout 90 may be provided adjacent the outer end of the tube 86 through which distilled water 92 may drain, in the direction of arrow 88A. Any desired use, not shown, may be made of the fresh water obtained from the distillation process.

From the above, it will be apparent that for best operation of the system, the basin 10, and associated structure, should be located at a warm site protected from cooling ocean breezes to provide for maximum temperature differential between the ambient temperature and the temperature of the cooled air exiting the condenser. However, it should be located sufficiently near the ocean for ease in pumping cold ocean water into the basin. However, by burying the water supply line 28 in the ground, as illustrated, the ocean water pumped therethrough is insulated from the ambient atmosphere to maintain the low temperature thereof required for operation of the system. Also, overflow of excess water from the basin helps to reduce the rate of buildup of materials, such as salt, within the basin, thereby maximizing the time between which solid deposits must be cleared from the basin.

The air inlet passage 84 preferably is of cylindrical shape and is located adjacent the center of the dome 16 to facilitate rotational motion of the air as it passes into the air inlet passage. As is well understood, due to Coriolis acceleration, air traveling away from the equator is deflected, eastward, and air traveling toward the equator is deflected westward. Consequently, in the Northern hemisphere, the air will rotate in a counterclockwise direction, and in the Southern hemisphere it will rotate clockwise in passing through the vertical inlet tube 84. In FIG. 2B, a Northern hemisphere location is indicated by air rotation counterclockwise in the direction of arrows 94. A cyclonic wind is therefore produced within the dome 16, with a vortex extending along the axis of the air inlet passage 84. The rotating mass of air functions as the rotor of a gyroscope which, of course, is subject to gyroscopic inertia, precession, and the like.

Energy of resultant whirling, or cyclonic, wind is readily harnessed as by locating wind-operated means in the path thereof. Any suitable wind-driven means may be employed and, for purposes of illustration, three propeller-driven generators 96A, 96B and 96C are shown mounted at the rim of the air inlet tube 84. They are oriented such that the propellers normally face in the direction of the cyclonic wind for maximum coupling therewith. Electrical power generated may be used for any desired purposes, not shown. Due to the cyclonic motion of the mass of air inside the dome, high velocity winds are produced which are capable of generating large amounts of useful energy, such as electricity, when properly harnessed. The winds within the dome may also serve to generate ripples, or waves, on the surface of water 24 in the basin to further promote evaporation thereof.

It will be apparent that the drawings are not to scale but, primarily, comprise diagrammatic showings which are intended to illustrate the invention. A wide range of sizes is possible in the employment of the invention, including extremely large sizes. For example, the wave-operated pump may be provided with a pump cylinder having a diameter of, say, three feet, and a fifty ton surface float for lifting the same. The pump may be located at a depth of, say, fifty feet, and the pump cylinder may have a length of, say, twenty feet to accomodate normal wave and tidal motions. The basin 10 and dome 16 covering the same also may be of large size, if desired. For example, a covered basin having a surface area on the order of one square mile could be employed, in which case a large condenser with a large inlet passage leading thereto would be used to accomodate a large volume of air flow therethrough. It also will be apparent that the wave-operated pump has many more applications than that illustrated. Also, solar distillation may be effected without harnessing of the cyclonic winds produced under the dome. Similarly, the generation of the cyclonic wind may be of prime consideration, with little or no use being made of the distilled water. Where the cyclonic winds are not harnessed, it may be desired to include baffles under the dome and/or within the inlet passage 84 to impede the cyclonic flow thereof and, thereby, limit the velocity thereof. Also, by locating the air inlet passage 84 adjacent the edge of the basin, away from the center of the dome, cyclonic action would be impeded.

The invention having been described in detail in accordance with requirements of the Patent Statutes, various other changes and modifications will suggest themselves to those skilled in this art. For example, means for controlling the size of the various passages, such as the air inlet and outlet passages for the condenser, may be included for control of airflow in the system. Obviously, a condenser could be employed in which the cold ocean water flows through tubes, and the moisture-laden air flows along the outside surfaces of the tubes.

In any case, good heat transfer action between the hot humid air entering the condenser, and the cold ocean water is desired for maximum cooling of air to promote air flow therethrough. Also, control of the amount of cooling water pumped into the basin may be provided. In addition, the condenser may be provided with a shell, or housing, surrounding the tubes 82 through which the cold ocean water is circulated. With this arrangement, the cooling water may be discharged outside the basin, rather than mixing the same with the solar heated basin water. Enough ocean water could be supplied to the basin to make up for evaporation losses. In an obvious extension of the above-described arrangement, the vapor condensing means may be located outside the basin, therebeneath. With such an arrangement, the generally vertical air inlet passage to the condenser would extend through the bottom of the basin. The air outlet passage from the condenser would extend, or be inclined downwardly, as with the present arrangement, for the downward flow of the cooled air and condensed water vapor therethrough. Again, with this modification, mixing of the solar heated basin water and condenser cooling water is avoided. Some of the condenser cooling water, discharged from the condenser, could be supplied to the basin to replenish the supply thereof, as required. It is intended that the above and other such changes and modifications shall fall within the spirit and scope of the invention as defined in the appended claims.

I claim:

1. In a system for obtaining air movement, the combination comprising,
    a basin of water,
    a solar energy-transmitting cover over said basin for heating water contained therein,
    air inlet means for providing air from a location outside said system to a location beneath said cover above the surface of water in the basin,
    surface type heat exchange means adjacent the bottom of said basin for cooling air passing therethrough by cooling water pumped thereto,
    vertically extending air inlet passage means having an upper end terminating above the surface of the water beneath said cover in a source of air to be cooled and a lower end connected to said heat exchange means for supplying air thereto, said air inlet passage means providing communication between said heat exchange means and air source beneath said cover above the surface of the water in the basin,
    air outlet passage means for the heat exchange means extending downwardly therefrom for unpumped gravity flow of cooled air downwardly through said heat exchange means from said air inlet passage means to a location outside said basin, and
    wind-operated means under the cover for operation by air flowing therebeneath.

2. In a system as defined in claim 1 wherein said system is located near a large body of water such as an ocean, sea, or the like, said system including
    means for pumping water from said large body of water into said basin for flow to said heat exchange means for cooling air passing therethrough.

3. In a system as defined in claim 2 wherein the surface of the large body of water is subject to wave action, and
    said means for pumping water is operated by wave motion of said large body of water.

4. In a system as defined in claim 3 wherein said means for pumping water comprises,
    a vertically positioned elongated cylinder attached to the floor of said large body of water,
    inlet means at the bottom of said cylinder through which water from the body of water enters the cylinder,
    a piston vertically reciprocally movable within said cylinder,
    a cylinder head closing the upper end of the cylinder,
    a piston rod attached to said piston and extending vertically upwardly through said cylinder head in liquid-tight engagement therewith,
    inlet valve means in said piston open during downstroke of the piston and closed during up-stroke thereof,
    a surface float attached to said piston rod for up-stroke operation of said piston in response to wave action, said piston moving downwardly under force of gravity for downstroke thereof.

5. In a system as defined in claim 1 wherein
    air enters the air inlet passage means with cyclonic motion due to Coriolis acceleration, said wind-operated means under the cover being located in the cyclonically moving air for operation thereby.

6. In a system as defined in claim 5 wherein said cover is dome shaped with the center thereof substantially in axial alignment with the vertically extending air inlet passage means.

7. In a cyclonic wind generator system the combination comprising,
    a basin of water,
    a dome covering said basin,
    air inlet means for providing air from a location outside said system to a location beneath said dome above the surface of water in the basin,
    heat exchange means beneath the dome adjacent the bottom of the basin,
    vertically extending air inlet passage means beneath the dome in axial alignment with the dome axis, said air inlet passage having an upper end terminating beneath the dome above water in the basin and a lower end in communication with said heat exchange means for supply of air thereto, air entering said air inlet passage means from beneath the dome with a cyclonic motion due to Coriolis acceleration thereof,
    air outlet means for the heat exchange means extending downwardly therefrom for gravity flow of cooled air through said heat exchange means, the discharge end of said air outlet means terminating outside said dome, and
    wind-operated means under the dome responsive to the cyclonic air flow.

8. In the combination as defined in claim 2 wherein said dome is made of solar energy-transmitting material, said heat exchange means condensing water vapor contained in air passing therethrough for production of distilled water.

* * * * *